(12) United States Patent
Nishida (10) Patent No.: US 10,309,323 B2
(45) Date of Patent: Jun. 4, 2019

(54) CONTROL APPARATUS FOR VEHICLE (71) Applicant: TOYOTA JIDOSHA KABUSHIKI KAISHA, Toyota-shi, Aichi-ken (JP)

(72) Inventor: Hideyuki Nishida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/202,733

(22) Filed: Jul. 6, 2016

(65) Prior Publication Data

US 2017/0009668 A1    Jan. 12, 2017

(30) Foreign Application Priority Data

Jul. 8, 2015 (JP) .................................. 2015-137296

(51) Int. Cl.
| | |
|---|---|
| *F02D 13/02* | (2006.01) |
| *B60T 13/57* | (2006.01) |
| *F02D 13/04* | (2006.01) |
| *B60T 13/46* | (2006.01) |
| *B60T 13/66* | (2006.01) |
| *B60T 17/02* | (2006.01) |
| *F02D 29/02* | (2006.01) |

(Continued)

(52) U.S. Cl.
CPC .............. *F02D 13/04* (2013.01); *B60T 13/46* (2013.01); *B60T 13/662* (2013.01); *B60T 17/02* (2013.01); *F02D 13/0207* (2013.01); *F02D 29/02* (2013.01); *F02D 41/0005* (2013.01); *F02D 41/022* (2013.01); *F02D 41/12* (2013.01); *F02D 41/123* (2013.01); *F02D 41/042* (2013.01); *F02D 2041/001* (2013.01); *F02D 2250/41* (2013.01); *Y02T 10/42* (2013.01)

(58) Field of Classification Search
CPC .... F02D 13/06; F02D 17/02; F02D 2009/024; F02D 2041/0012; F02D 2200/0406; F02D 2250/41; F02D 41/0005; F02D 41/0087; F02D 41/123; B60W 10/06; B60W 2030/18081; B60W 2510/0671; B60W 2540/12; B60W 30/18072

See application file for complete search history.

(56) References Cited

U.S. PATENT DOCUMENTS

| | | | | |
|---|---|---|---|---|
| 4,078,631 A | * | 3/1978 | Kadota ................ | B60K 31/105 123/325 |
| 6,412,455 B1 | * | 7/2002 | Ogiso ..................... | B60T 13/52 123/399 |

(Continued)

FOREIGN PATENT DOCUMENTS

| | | |
|---|---|---|
| CN | 103253255 A | 8/2013 |
| JP | H10-89123 A | 4/1998 |

(Continued)

*Primary Examiner* — John M Zaleskas
(74) *Attorney, Agent, or Firm* — Hunton Andrews Kurth LLP (57) ABSTRACT

A vehicle having a valve stop mode control unit configured such that an intake valve and an exhaust valve are stopped in a closed state during rotation of an output shaft, supply of fuel to an engine is stopped, a clutch is made to be in an engaged state, and pistons are driven by rotational forces from driving wheels through the output shaft. When there is a request for valve stop inertial running, a negative pressure is supplied to an intake passage by a vacuum pump.

2 Claims, 6 Drawing Sheets

(51) Int. Cl.
    *F02D 41/02*    (2006.01)
    *F02D 41/12*    (2006.01)
    *F02D 41/00*    (2006.01)
    *F02D 41/04*    (2006.01)

(56) References Cited

U.S. PATENT DOCUMENTS

| | | | | |
|---|---|---|---|---|
| 6,866,020 B2* | 3/2005 | Allston | ............... | F02D 9/08 |
| | | | | 123/399 |
| 2002/0112902 A1* | 8/2002 | Wakashiro | ............ | B60K 6/485 |
| | | | | 180/65.26 |
| 2002/0112903 A1* | 8/2002 | Wakashiro | ............ | B60K 6/485 |
| | | | | 180/65.26 |
| 2002/0115526 A1* | 8/2002 | Wakashiro | ............ | B60K 6/485 |
| | | | | 477/5 |
| 2002/0115532 A1* | 8/2002 | Wakashiro | ............... | B60K 6/48 |
| | | | | 477/111 |
| 2002/0116099 A1* | 8/2002 | Tabata | ............... | B60K 6/32 |
| | | | | 701/22 |
| 2002/0116112 A1* | 8/2002 | Wakashiro | ............ | B60K 6/485 |
| | | | | 701/110 |
| 2003/0028295 A1* | 2/2003 | Wakashiro | ............ | B60K 6/485 |
| | | | | 701/22 |
| 2003/0054919 A1* | 3/2003 | Matsubara | ............... | F01L 1/18 |
| | | | | 477/4 |
| 2003/0054921 A1* | 3/2003 | Furukawa | ............... | F01L 1/022 |
| | | | | 477/111 |
| 2004/0026928 A1* | 2/2004 | Wakashiro | ............... | B60K 6/48 |
| | | | | 290/40 C |
| 2004/0147364 A1* | 7/2004 | Wakashiro | ............ | B60K 6/485 |
| | | | | 477/3 |
| 2008/0041336 A1* | 2/2008 | Gibson | ............... | F02D 13/04 |
| | | | | 123/322 |
| 2011/0174266 A1* | 7/2011 | Cunningham | ............ | B60T 17/02 |
| | | | | 123/403 |
| 2012/0010047 A1* | 1/2012 | Strengert | ............... | B60W 10/02 |
| | | | | 477/171 |
| 2012/0024261 A1* | 2/2012 | Ulrey | ............... | F02D 11/02 |
| | | | | 123/336 |
| 2015/0166065 A1* | 6/2015 | Kuroki | ............... | B60W 10/02 |
| | | | | 477/185 |
| 2015/0191168 A1* | 7/2015 | Mitsuyasu | ............ | B60W 20/00 |
| | | | | 701/54 |
| 2015/0274166 A1* | 10/2015 | Hirai | ............... | F02D 29/02 |
| | | | | 701/67 |
| 2015/0274168 A1* | 10/2015 | Kuroki | ............... | B60W 10/184 |
| | | | | 701/70 |
| 2015/0284004 A1* | 10/2015 | Kim | ............... | F16H 61/14 |
| | | | | 477/168 |
| 2015/0291171 A1* | 10/2015 | Kuroki | ............... | F02D 41/12 |
| | | | | 701/70 |
| 2015/0298698 A1* | 10/2015 | Kim | ............... | F16D 48/066 |
| | | | | 701/48 |
| 2015/0307103 A1* | 10/2015 | Kuroki | ............... | F16H 61/21 |
| | | | | 701/70 |

FOREIGN PATENT DOCUMENTS

| | | | |
|---|---|---|---|
| JP | 2004143990 A | * | 5/2004 |
| JP | 2006-131032 A | | 5/2006 |
| JP | 2014-091398 A | | 5/2014 |

* cited by examiner

FIG.1

| RUNNING MODE | | ENGINE 14 OPERATION | CLUTCH C1 | ENGINE BRAKE FORCE | DECELERATION |
|---|---|---|---|---|---|
| | REGULAR ACCELERATION RUNNING | OPERATION | ENGAGED | - | - |
| VALVE OPERATION RUNNING | REGULAR DECELERATION RUNNING (ENGINE BRAKE RUNNING) | DRIVEN ROTATION (F/C PRESENT OR ABSENT) | ENGAGED | LARGE | LARGE |
| | VALVE STOP INERTIAL RUNNING | F/C, DRIVEN ROTATION, CYLINDER REST | ENGAGED | SMALL | SMALL |

CONTROL APPARATUS FOR VEHICLE

CROSS-REFERENCES TO RELATED APPLICATIONS

This application claims the benefit of Japanese Patent Application No. 2015-137296, filed Jul. 8, 2015, which is hereby incorporated by reference wherein in its entirety.

BACKGROUND OF THE INVENTION

Field of the Invention

The present invention relates to a control apparatus for a vehicle, and particularly, to an apparatus applied to an engine provided with a valve operation mechanism that can stop an intake valve and an exhaust valve in a closed state during rotation of an output shaft of the engine.

Description of the Related Art

There is well known a valve operation mechanism that can stop an intake valve and an exhaust valve in a closed state during rotation of an output shaft of an engine. In the engine provided with this type of valve operation mechanism, in a state of connecting the engine and driving wheels with engagement of a clutch, an operation of the intake valve and an operation of the exhaust valve of the engine are stopped in a closed state, making it possible to execute an inertial running of the vehicle without executing fuel supply to the associated cylinders in the engine (for example, Japanese Patent Laid-Open No. 2014-091398). This running mode is called "valve stop inertial running" as needed in the present specification.

During execution of the valve stop inertial running, the clutch in the power transmission route is made to be in a connecting state. Therefore, the output shaft of the engine and pistons connected thereto are driven by power transmitted from the driving wheels. In this valve stop inertial running, as compared with an inertial running in a state of no valve stop, a so-called pumping loss is reduced. Therefore, an engine brake force is reduced to increase a free running distance (that is, a running distance by inertia) and reduce opportunities of fuel resupply, making it possible to contribute to an improvement on fuel efficiency. Further, in a case where a hydraulic pressure by a mechanical oil pump driven by an engine is used in the other devices (automatic transmission or the like), the supply of the hydraulic pressure can continue regardless of the valve stopping.

In the valve stop inertial running, the piston is driven by a rotational force from the driving wheel side without use of a driving force generated in the piston. In contrast to this, a running mode of operating (i.e. activating) the intake valve and the exhaust valve during rotation of the output shaft of the engine (in other words, regular running) is called "valve operation running" as needed in the present specification.

SUMMARY OF THE INVENTION

During execution of the valve stop inertial running, even when a throttle valve is closed, air enters from a clearance in the periphery of the throttle valve, and a pressure in an intake passage downstream of the throttle valve is increased to an atmospheric pressure or the vicinity thereof. On the other hand, for avoiding misfiring to improve emissions, fuel supply control that supplies fuel of the amount in accordance with a pressure in the intake passage (intake conduit pressure) is widely executed.

Therefore, when the vehicle running mode returns back to the valve operation running from the valve stop inertial running, as the pressure in the intake passage is increased to the atmospheric pressure or the vicinity thereof, a large deal (amount larger than an idle equivalent amount) of fuel in accordance with the increased pressure is supplied by the aforementioned fuel supply control. As a result, excessive engine torque in response to an acceleration requirement through an accelerator pedal is rapidly generated to generate vibrations, possibly deteriorating drivability of a vehicle.

The present invention is made in view of the foregoing problems, and an object of the present invention is to suppress vibrations due to excessive engine torque when a vehicle running mode returns back to a valve operation running from a valve stop inertial running.

According to a first aspect of the present invention, there is provided a control apparatus for a vehicle configured to control a vehicle comprising a valve operation mechanism that can stop an intake valve and an exhaust valve in an engine in a closed state during rotation of an output shaft in the engine, and a clutch that can switch a power transmission route between the engine and a driving wheel between an engaged state and a disengaged state, further comprising:

a valve stop mode control unit configured to, in a case where a request for valve stop inertial running is made, stop the intake valve and the exhaust valve in the closed state during the rotation of the output shaft, stop supply of fuel to the engine, control a throttle valve of the engine to an idling opening or less, and set the clutch in an engaged state to drive pistons of the engine by a rotational force from the driving wheel through the output shaft; and an intake pressure control unit configured to, in a case where the request for valve stop inertial running is made, supply a negative pressure to an intake passage section by a vacuum pump connected to the intake passage section.

According to the first aspect, in a case where the request for valve stop inertial running is made, the intake pressure control unit supplies the negative pressure to the intake passage section between the throttle valve and the intake valve by the vacuum pump. As a result, when the vehicle running mode returns back to the valve operation running from the valve stop inertial running, a large deal of fuel is not supplied in accordance with the high pressure in the intake passage section such as an atmospheric pressure, therefore making it possible to suppress the vibration due to the excessive engine torque. It should be noted that the order of the control by the valve stop mode control unit is not limited to the order described in claim 1.

According to a second aspect of the present invention, the vacuum pump is configured to supply a negative pressure to a brake booster for assisting a brake force of a brake.

According to the second aspect, the common vacuum pump can be used for both of the reduction in pressure of the intake passage and the supply of the negative pressure to the brake booster.

According to a third aspect of the present invention, the engine further comprises a vacuum switching valve for opening/closing a connecting conduit that connects the vacuum pump and the intake passage, wherein the intake pressure control unit is further configured to control the vacuum switching valve.

According to the third aspect, since the pressure of the intake passage section can be reduced by controlling the vacuum switching valve, the present invention can obtain the desired effect with a simple structure.

According to a fourth aspect of the present invention, the intake pressure control unit is further configured to control a pressure of the intake passage section to be below a predetermined value smaller than an atmospheric pressure, in a case where a request for valve stop inertial running is made.

According to the fourth aspect, since the pressure of the intake passage section is controlled to be below the predetermined value smaller than the atmospheric pressure, it is possible to suppress the extent in use of the negative pressure of the vacuum pump through the intake passage by setting this predetermined value properly.

Further features of the present invention will become apparent from the following description of exemplary embodiments (with reference to the attached drawings).

DESCRIPTION OF THE EMBODIMENTS

Hereinafter, an explanation will be in detail made of embodiments of the present invention with reference to the accompanying drawings.

Figure 1:
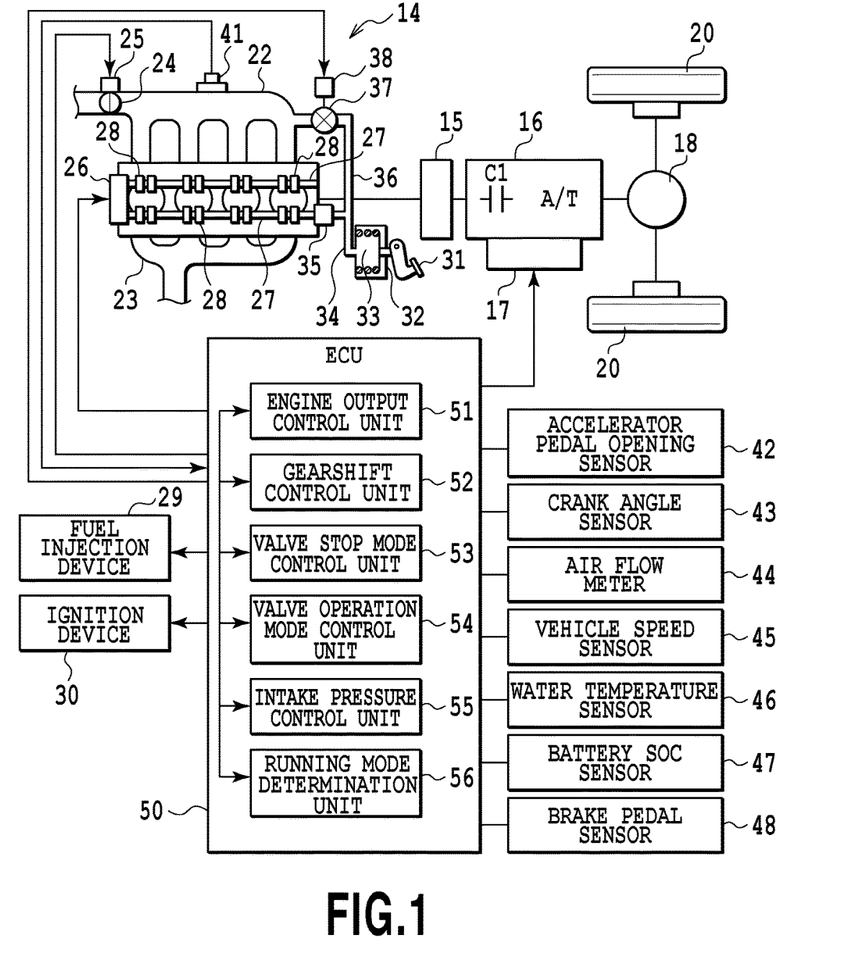
FIG. 1 is a functional block diagram illustrating the schematic configuration of a vehicle according to a first embodiment of the present invention.

FIG. 1 is a functional block diagram illustrating the schematic configuration of a vehicle 10 according to a first embodiment of the present invention. In FIG. 1, the vehicle 10 includes an engine 14 having a plurality of cylinders, and an automatic transmission 16. Power of the engine 10 as a driving power source is transmitted to left and right driving wheels 20 through the automatic transmission 16 and a differential gear device 18. A power transmission device 15 such as a damper device and a torque converter is provided between the engine 14 and the automatic transmission 16. A motor generator operable as the driving power source may be additionally provided between the engine 14 and the automatic transmission 16.

The engine 14 is an internal combustion engine that generates power by combustion of fuel. The engine 14 is a gasoline engine of an in-line four-cylinder, but the number of cylinders in the engine 14 may be set to any number, and the engine 14 may use fuel of a different kind like a diesel engine. An intake manifold 22 is connected to intake ports of the engine 14. An exhaust manifold 23 is connected to exhaust ports of the engine 14.

A throttle valve 24 is installed upstream of a branch portion of the intake manifold 22 in the intake passage. The throttle valve 24 is a butterfly valve, and is driven by a throttle actuator 25, such as a DC servo motor or a stepping motor. The intake passage upstream of the throttle valve 24 is open to outside air through a not shown air cleaner. The downstream side of the exhaust manifold 23 is open to outside air through catalyst devices and a muffler both not shown.

The engine 14 is provided with a variable valve mechanism 26 that can stop the intake valve and the exhaust valve in a closed state. The variable valve mechanism 26 can separate all of the intake and exhaust valves in a plurality of cylinders from a crank shaft mechanically to stop them. Therefore, a pumping loss is reduced at the time the engine 14 is driven-rotated at fuel cutting (F/C), thus making it possible to reduce the engine brake force and increase the free running distance.

The variable valve mechanism 26 is provided with cam lobe members 28 that project/retreat radially from cam base members disposed integrally with cam shafts 27, and the cam lobe member 28 can be controlled in a two-step manner of a projecting state and a retreating (retracted) state by a hydraulic or electromagnetic actuator. At the projecting state, respective lift amount for regular running act on the intake valve and the exhaust valve. At the retreating state, a lift amount of each of the intake valve and the exhaust valve becomes zero, and thereby the intake valve and the exhaust valve are stopped in the closed state. An example of the variable valve mechanism 26 may include any other type that can stop an intake valve and an exhaust valve in a closed state during rotation of a crank shaft (not shown) in the engine 14. The variable valve mechanism 26 of such other type includes, for example, (i) a mechanism in which two kinds of high and low cam lobe members fixed to a cam shaft respectively abut on rocker arms and the two rocker arms are coupled to each other as needed, and (ii) a mechanism in which the cam shaft is moved axially to select one of the two kinds of high and low cam lobe members as needed, but is not limited thereto. In the variable valve mechanism 26, even when the intake valve and the exhaust valve are stopped in the closed state, the cam shaft 27 rotates in a speed in synchronization with the crank shaft (not shown) of the engine 14.

The engine 14 is provided with a fuel injection device 29. The fuel injection device 29 includes fuel injection valves installed in each of cylinders one by one and a drive circuit for controlling a fuel injection quantity from the fuel injection valve. Each of the fuel injection valves is installed for injecting fuel into a combustion chamber of each of the cylinders, but may be provided to inject fuel to each of the intake ports. The engine 14 is also provided with an ignition device 30. The ignition device 30 includes ignition plugs installed in each of the cylinders one by one and a drive circuit for controlling power to the ignition plugs.

On the other hand, the vehicle 10 is provided with a brake booster 32 for assisting an operation of a brake pedal 31 by a driver. The brake booster 32 doubles up a brake pedal operation force by using a negative pressure supplied to a vacuum chamber 33 at brake operation. The vacuum chamber 33 is connected to a mechanical vacuum pump 35 through a booster passage 34. An input shaft of the vacuum pump 35 is connected directly to the cam shaft 27 of the exhaust side.

A branch passage 36 is branched to be connected to the booster passage 34. The branch passage 36 connects the intake manifold 22 to the booster passage 34 to allow communication. A vacuum switching valve (VSV) 37 is arranged in the halfway part of the branch passage 36. The VSV 37 is, for example, a poppet valve, and can selectively realize an open state of allowing communication of the branch passage 36 and a closed state of blocking the branch passage 36. The VSV 37 is driven by a valve actuator 38 such as a solenoid. When the valve actuator 38 is not energized, the VSV 37 is made in the closed state. When the engine 14 is in operation and the VSV 37 is open, a negative pressure is supplied into the vacuum chamber 33, the booster passage 34 and the branch passage 36 by the vacuum pump 35 to reduce a pressure in the intake passage section between the throttle valve 24 and the intake valve. In other words, the vacuum pump 35 basically acts as a vacuum source of the brake booster 32, but by opening the VSV 37, may be used also as a vacuum source for the intake passage section between the throttle valve 24 and the intake valve. Output of the vacuum pump 35 is set such that a pressure in the intake passage section when the VSV 37 is open is equal to a pressure in the intake passage section at idling of the engine 14.

The automatic transmission 16 is a stepped automatic transmission of a planetary gear type. In the automatic transmission 16, a plurality of gear shift positions having gear ratios different from each other are established depending upon an engaged/disengaged state of a plurality of hydraulic friction engaging devices (clutches and brakes). The automatic transmission 16 is controlled by a hydraulic control device 17. In the automatic transmission 16, a predetermined gear shift position is established according to an operating condition including an operation of an accelerator pedal by a driver and a vehicle speed when the hydraulic friction engaging devices are respectively controlled to be engaged/disengaged by electromagnetic hydraulic control valves and electromagnetic switching valves provided in the hydraulic control device 17. An example of the automatic transmission 16 may include the other type of stepped transmissions or continuously variable transmissions.

A clutch C1 acting as an input clutch of the automatic transmission 16 is provided inside of the automatic transmission 16. The clutch C1 is a hydraulic friction engaging device, and is controlled by the hydraulic control device 17. The clutch Cl can switch the power transmission route between the engine 40 and the driving wheels 20 to an engaged state or a disengaged state. Supply of hydraulic pressures to the hydraulic control device 17 is executed by a mechanical oil pump (not shown) to be driven by the engine 14.

An intake pressure sensor 41 is installed in the intake manifold 22 to detect a pressure in the intake passage section between the throttle valve 24 and the intake valve. An accelerator pedal opening sensor 42 is installed in the vicinity of a not shown accelerator pedal to detect a depressing amount of the accelerator pedal. A crank angle sensor 43 is installed in the vicinity of the not shown crank shaft of the engine 14 to detect a rotational speed of the crank shaft. An air flow meter 44 is installed in the intake passage upstream of the throttle valve 24 to detect an intake air quantity. A vehicle speed sensor 45 is installed in the vicinity of each driving wheel 20 to detect a vehicle speed. A water temperature sensor 46 is installed in a cooling water passage of the engine 14 to detect a cooling water temperature. An SOC (state of charge) sensor 47 is installed in a not shown battery to detect an SOC of the battery. A brake pedal sensor 48 is installed in the vicinity of a brake pedal 31 to detect a depressing pressure of the brake pedal.

The vehicle 10 is provided with an electronic control unit (ECU) 50 configured to execute control of the vehicle 10 in association with the engine 14 and the automatic transmission 16. The ECU 50 is configured to execute output control of the engine 14, gearshift control of the automatic transmission 16 and control of the VSV 37. The ECU 50 is configured to include a well-known microcomputer provided with a CPU, a RAM, a ROM, an input interface, and an output interface. The CPU uses a temporary memory function of the RAM and executes signal processing according to programs preliminarily stored in the ROM, thus executing various types of control in the vehicle 10.

Various kinds of sensors including the intake pressure sensor 41, the accelerator pedal opening sensor 42, the crank angle sensor 43, the air flow meter 44, the vehicle speed sensor 45, the water temperature sensor 46, the SOC sensor 47 and the brake pedal sensor 48 as described above are connected to the input interface of the ECU 50, and signals from the various kinds of the sensors are input thereto.

Various kinds of actuators including the hydraulic control device 17, the throttle actuator 25, the variable valve mechanism 26, the fuel injection device 29 and the valve actuator 38 described above are connected to the output interface of the ECU 50, and signals to the various kinds of the actuators are output thereto.

The ECU 50 operably includes an engine output unit 51, a gearshift control unit 52, a valve stop mode control unit 53, a valve operation mode control unit 54, an intake pressure control unit 55 and a running mode determination unit 56.

The engine output control unit 51, for example, for obtaining a required output by a driver, controls opening/closing of the throttle valve 24, controls a fuel injection quantity by the fuel injection device 29, and controls an ignition timing by the ignition device 30. Specifically, the engine output control unit 51 calculates, for example, a target value of each of a throttle opening, a fuel injection quantity and an ignition timing based upon a depressing amount of the accelerator pedal detected by the accelerator pedal opening sensor 42, a vehicle speed detected by the vehicle speed sensor 45, the present gear shift position of the automatic transmission 16 and an intake conduit pressure detected by the intake pressure sensor 41 to obtain the required output. In addition, the engine output control unit 51 controls the throttle valve 24, the fuel injection device 29 and the ignition device 30 according to these target values. Particularly, the fuel injection quantity by the fuel injection device 29 is set to the amount in accordance with the intake conduit pressure for avoiding misfiring to improve emissions. The intake conduit pressure uses a detection value of the intake pressure sensor 41, and besides, maybe estimated based upon, for example, a detection value of the air flow meter 44, a throttle opening, an engine rotational speed, a valve timing and a valve opening. In this fuel injection control, a fuel injection quantity can be set based upon a parameter correlative to an intake conduit pressure. An example of such a parameter may include an intake air quantity instead of the intake conduit pressure. On the other hand, when necessary, the engine output control unit 51 can stop fuel supply from the fuel injection device 29 (fuel cut).

In addition, the engine output control unit 51 controls an idle speed control valve (not shown) provided in a bypass passage bypassing the throttle valve 24, thus making it possible to execute idle speed control that suppresses fluctuations of an engine rotational speed due to load fluctuations by auxiliary devices at idling.

The gearshift control unit 52 executes gearshift control of the automatic transmission 16. Specifically, the gearshift control unit 52 executes a gearshift determination based upon, for example, a depressing amount of the accelerator pedal detected by the accelerator pedal opening sensor 42 and a vehicle speed detected by the vehicle speed sensor 45. The gearshift control unit 52, in a case where it is determined that the gearshift of the automatic transmission 16 should be executed, outputs a hydraulic command signal for engaging and/or disengaging the hydraulic friction engaging device involved in the gearshift of the automatic transmission 16 to the hydraulic control device 17 to achieve the determined gear shift position.

Figure 2:
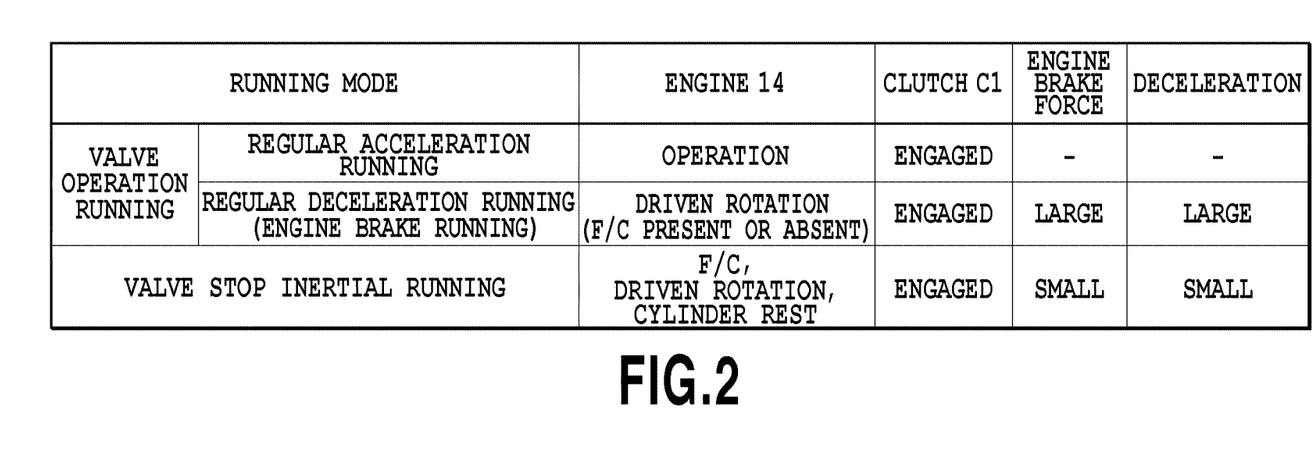
FIG. 2 is a diagram explaining a content of two running modes to be executed in the vehicle in FIG. 1.

The valve stop mode control unit 53 and the valve operation mode control unit 54 execute two kinds of running modes made up of valve stop inertial running and valve operation running illustrated in FIG. 2.

The valve stop mode control unit 53 stops operations of all the cylinders in the engine 14 in a state where the engine 14 and the driving wheels 20 are connected, through the engine output control unit 51 and the gearshift control unit 52, to execute the valve stop inertial running for vehicle inertial running. In the valve stop inertial running, the gearshift control unit 52 maintains the engaged state of the clutch C1 and connects the engine 14 and the driving wheels 20, and the engine output control unit 51 stops the fuel supply to the engine 14 (fuel cut). In addition, in the valve stop inertial running, the ECU 50 stops the operations of the intake valves and the exhaust valves in all the cylinders of the engine 14 in positions where all of the valves are in the closed state, by the variable valve mechanism 26. At this time, the crank shaft is driven-rotated in accordance with a vehicle speed or a gear shift position of the automatic transmission 16. However, since the intake/exhaust valves are stopped in the closed state, as compared with a case where the intake/exhaust valves are opened/closed in synchronization with the crank shaft, a loss by a pumping function is made smaller, and an engine brake force is reduced to be smaller than in a regular deceleration running (engine brake running). As a result, as compared with the valve operation running, a free running distance becomes longer to improve the fuel efficiency. In addition, even during the valve stopping, the supply of the hydraulic pressure to the hydraulic control device 17 can continue by the mechanical oil pump (not shown) driven by the engine 14. Further, the valve stop suppresses supply of oxygen to a catalyst device, making it possible to suppress a reduction in purification capability.

During the valve stop inertial running, the aforementioned idle speed control is cancelled, and the throttle valve 24 is controlled to be fully closed, that is, to the minimum opening as a mechanical limit. However, even during the valve stop inertial running, the idle speed control may be executed to control the throttle valve 24 to the idle opening or less in accordance with a load of the auxiliary devices.

The valve operation mode control unit 54 executes a valve operation running that operates the intake valve and the exhaust valve during rotation of the crank shaft, through the engine output control unit 51 and the gearshift control unit 52. In the valve operation running, the ECU 50 operates the intake valve and the exhaust valve during rotation of the crank shaft in a state where the engine 14 and the driving wheels 20 are connected (that is, in a state where the clutch C1 is engaged). The valve operation running includes a regular acceleration running in which the engine 14 is in a driving state, and a regular deceleration running (engine brake running) in which the engine 14 is in a driven state.

The valve operation mode control unit 54 executes supply of fuel to the engine 14 based upon a pressure in the intake passage section between the throttle valve 24 and the intake valve in a regular acceleration running. Specifically in the regular acceleration running, the engine output control unit 51, as described above, executes the output control of the engine 14 to obtain the required output from a driver. The gearshift control unit 52 executes the gearshift control of the automatic transmission 16 including the engagement of the clutch C1 based upon a vehicle speed and the required output.

In the regular deceleration running (engine brake running), the engine output control unit 51 and the gearshift control unit 52 driven-rotates the engine 14 in a state where the engine 14 and the driving wheels 20 are connected, thus executing the vehicle running with effect of engine braking. The regular deceleration running is executed, for example, at the time the accelerator pedal is released. In the regular deceleration running, an engine brake force is generated by a rotation resistance consisting of a pumping loss, friction torque or the like by the driven rotation of the engine 14. In the regular deceleration running, the idle speed control is executed, and an opening of the throttle valve 24 is made to an idle opening in accordance with loads of auxiliary devices. A fuel injection quantity of the fuel injection device 29 is made to a predetermined quantity (minimum quantity) similarly to an idle state. In the automatic transmission 16, a predetermined gear shift position is established in accordance with a vehicle speed or the like and the clutch C1 is held in an engaged state. As a result, the engine 14 is driven-rotated in a predetermined rotational speed defined in accordance with a vehicle speed and a gearshift ratio to generate an engine brake force in accordance with the rotational speed.

The intake pressure control unit 55 controls an operation of the VSV 37 to control a pressure in the intake passage section between the throttle valve 24 and the intake valve.

The running mode determination unit 56 determines which mode of two kinds of running modes composed of the above valve operation running (regular acceleration running, regular deceleration running) and the valve stop inertial running is selected, and switches the running mode to the determined running mode. Specifically, the running mode determination unit 56 basically determines execution of the regular acceleration running, for example, at accelerator pedal depressing when a depressing amount of the accelerator pedal is not determined to be zero. In addition, the running mode determination unit 56 basically determines execution of the regular deceleration running, for example, when the accelerator pedal is released and a brake operating force is larger than a predetermined brake operating force. On the other hand, the running mode determination unit 56 basically determines execution of the valve stop inertial running, for example, in a case where the accelerator pedal and the brake pedal both are released.

Figure 3:
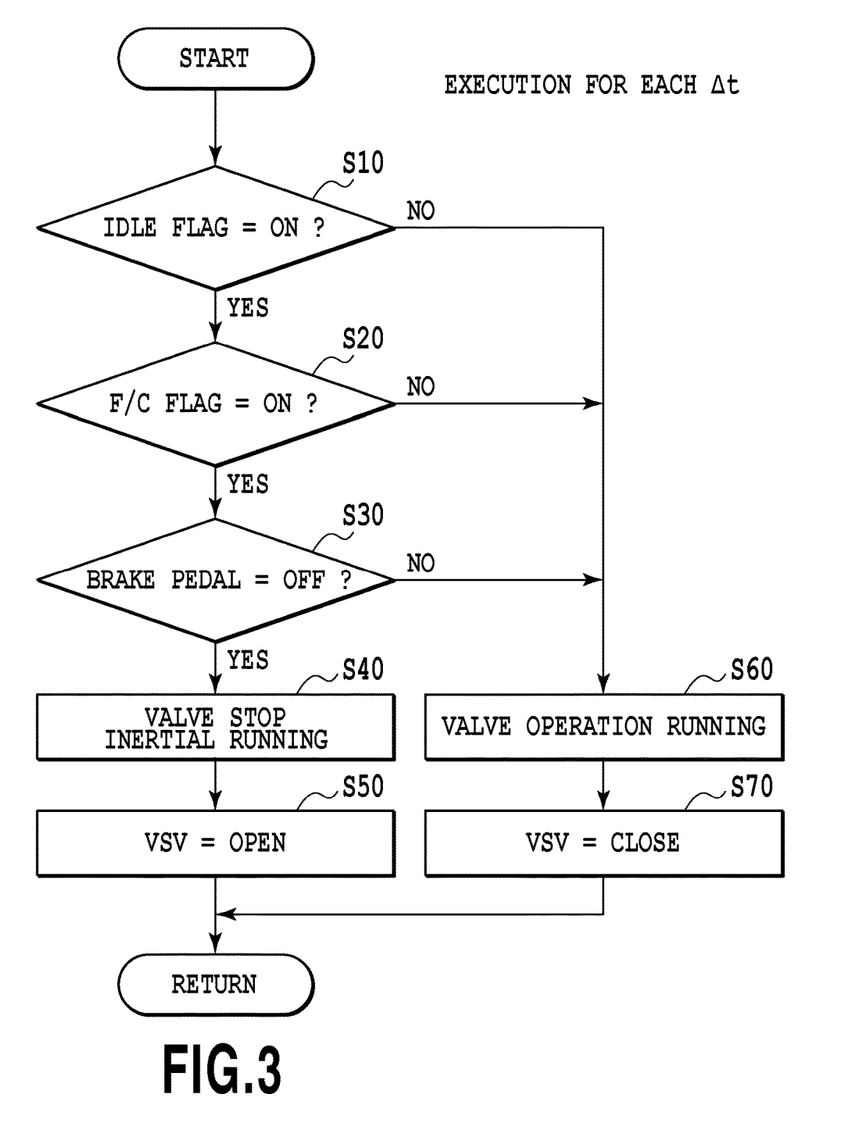
FIG. 3 is a flow chart explaining running mode selection control to be executed in the first embodiment.

FIG. 3 is a flow chart explaining the running mode selection control to be executed in the ECU 50. The running mode selection control is repeatedly executed in a predetermined cycle time Δt on a condition that a not shown power switch is on.

In FIG. 3, step S10 to step S30 correspond to the running mode determination unit 56. First, the ECU 50 determines whether a predetermined idle flag is on (step S10). The idle flag is set to be on in a case where in a separate idle condition determination routine, a condition that an accelerator pedal opening is at a threshold or less (including zero) is satisfied, and is set to be off in a case where the condition is not satisfied. It should be noted that the idle flag may be on in a case where the throttle opening is at a reference value θth corresponding to an idle rotational speed of the engine 14 or less. If yes in step S10 (that is, if the idle flag is on), the process goes to step S20.

Next, the ECU 50 determines whether a predetermined fuel cut flag is on (step S20). The fuel cut flag is set to be on in a case where in a separate fuel cut condition determination routine, a condition (that is, fuel cut condition) that "the engine rotational speed is within a predetermined range (for example, 1200 to 1600 rpm)", "the throttle opening is at a reference value θth corresponding to an idle rotational speed of the engine 14 or less", "the engine water temperature is at a predetermined value corresponding to warming-up finish or more" and "the SOC of the battery is at a predetermined value or more is satisfied, and is off in a case where the condition is not satisfied. If yes in step S20 (that is, in a case where the fuel cut flag is on), the process goes to step S30.

In step S30, the ECU 50 determines whether the brake pedal 31 is released. In a case where a depressing pressure of the brake pedal 31 is at a threshold value or less (including zero), in step S30 a positive determination is made and the process goes to step S40.

If yes in all of step S10 to step S30, that is, in a case where the idle condition and the fuel cut condition are satisfied and the depressing pressure of the brake pedal 31 is at the threshold value or less (including zero), the ECU 50 determines that there is the request for valve stop inertial running, and in step S40, the valve stop inertial running is executed. That is, by the control of the ECU 50, the engaged state of the clutch C1 is maintained to connect the engine 14 and the driving wheels 20 and the fuel supply to the engine 14 is stopped (fuel cut), and by the variable valve mechanism 26, the operations of the intake valves and the exhaust valves of all the cylinders in the engine 14 are stopped in the positions where all of the valves are in the closed state. The throttle valve 24 is controlled to be fully closed.

Next, in step S50, the ECU 50 controls the VSV 37 to be in an open state. Even when the vehicle is in the valve stop inertial running, since the cam shaft 27 is rotating, the vacuum pump 35 is in the middle of operation. Therefore, when the VSV 37 is opened, a negative pressure from the vacuum pump 35 is applied to the intake passage section between the throttle valve 24 and the intake valve, and the pressure in the intake passage section is maintained to a low pressure in accordance with the output of the vacuum pump 35. In other words, the intake passage section is suctioned by the vacuum pump 35.

On the other hand, if nowhere in either one of step S10 to step S30, that is, if the idle flag is off, the fuel cut flag is off or the brake pedal is depressed, the ECU 50 determines that there is no request for valve stop inertial running, and the process goes to step S60. In step S60, the ECU 50 executes the valve operation running. That is, by the control of the ECU 50, the intake valve and the exhaust valve are operated during the rotation of the crank shaft in a state where the engine 14 and the driving wheels 20 are connected (that is, in a state where the clutch C1 is engaged). As a result, when the brake pedal 31 is not depressed, the regular acceleration running in which the engine 14 is in the driving state is executed, and when the brake pedal 31 is depressed, the regular deceleration running (engine brake running) in which the engine 14 is in the driven state is executed. It should be noted that in a case where the valve stop inertial running is transitioned to the regular acceleration running, a delay time larger than a time required for an operation of the variable valve device 26 (that is, an operation in which a lift amount transitions from zero to a value for regular running) may be provided before start of fuel injection.

Next, in step S70, the ECU 50 controls the VSV 37 to be in the closed state. When the VSV 37 is closed, the negative pressure by the vacuum pump 35 does not act on the intake passage section between the throttle valve 24 and the intake valve.

Figure 4:
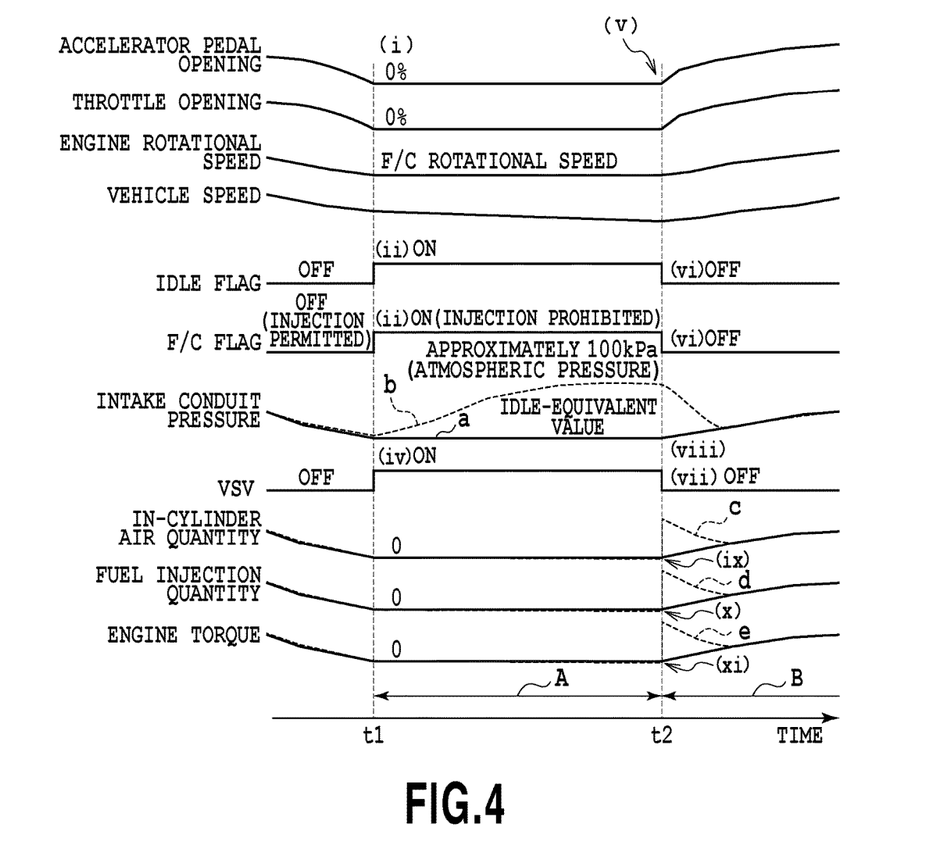
FIG. 4 is a time chart illustrating transition of various parameters in a case of executing the flow chart in FIG. 3.

FIG. 4 is a timing chart illustrating an example of an operation according to the first embodiment. Now, when the idle condition and the fuel cut condition are satisfied (i) by releasing the accelerator pedal by a driver, (ii) the idle flag and the fuel cut flag are on. Then, when the brake pedal is being released (S20, S30) at this point of time, the ECU 50 determines that there is the request for valve stop inertial running, and starts execution of the valve stop inertial running (A) (t1, S40). That is, by the control of the ECU 50, the engaged state of the clutch C1 is maintained to connect the engine 14 and the driving wheels 20 and the fuel supply to the engine 14 is stopped (fuel cut), and by the variable valve mechanism 26, the operations of the intake valves and the exhaust valves of all the cylinders in the engine 14 are stopped in the positions where all the valves are in the closed state. It should be noted that the engine rotational speed at this time is controlled to a preset rotational speed at fuel cutting by control of a gearshift ratio of the automatic transmission 16. The vehicle speed is gradually lowered, but since the pumping loss is suppressed, the effect of the engine brake is very small.

In addition, at the same time with the start of the valve stop inertial running (A), the VSV 37 is controlled to be in the open state by the control of the ECU 50 (iv, S50). As a result, a negative pressure from the vacuum pump 35 is applied to the intake passage section between the throttle valve 24 and the intake valve, and the pressure in the intake passage section is reduced, by suction of the vacuum pump 35, to be maintained to a low pressure in accordance with the output of the vacuum pump 35, that is, a value equal to the pressure in the intake passage section at idling of the engine 14 (solid line a). It should be noted that in a conventional device in which the negative pressure from the vacuum pump 35 is not applied to the intake passage section, the pressure in the intake passage section, as illustrated in a broken line b in FIG. 4, is increased to an atmospheric pressure (approximately 100 kPa) for a short time after the start of the valve stop inertial running (A) due to air entering from the upstream side through a clearance in the periphery of the throttle valve 24.

Next, when the idle condition and the fuel cut condition become unsatisfied due to depression of the accelerator pedal by a driver (v, t2), (ii) the idle flag and the fuel cut flag are off (vi). As a result, the ECU 50 starts execution of the valve operation running (B) (t2, S60). That is, by the control of the ECU 50, the engaged state of the clutch C1 is maintained to connect the engine 14 and the driving wheels 20, and by the variable valve mechanism 26, the intake valve and the exhaust valve the engine 14 are operated during the rotation of the crank shaft. As a result, the regular acceleration running is executed. It should be noted that in a case where the brake pedal 31 is depressed, the regular deceleration running (engine brake running) is executed.

In addition, at the same time with the start of the valve operation running (B), the VSV 37 is controlled to be in the closed state by the control of the ECU 50 (vii, S70). As a result, a negative pressure from the vacuum pump 35 becomes no longer applied to the intake passage section between the throttle valve 24 and the intake valve. However, since the intake valve and the exhaust valve start to operate, the pressure in the intake passage section (intake conduit pressure) continues to be a value equal to the pressure in the intake passage section at idling of the engine 14 or in the vicinity thereof by a function of the cylinder (viii).

In the valve operation running (B), the fuel injection quantity by the fuel injection device 29 is set to the amount in accordance with the intake conduit pressure for avoiding the misfiring and improving emissions, but since the intake conduit pressure is maintained to a low value equivalent to that at idling throughout the valve stop inertial running (A) (solid line a), an in-cylinder air quantity (ix) and a fuel injection quantity (x) do not rapidly increase at the start of the valve operation running (B). Therefore, the engine torque (xi) does not rapidly increase at the start of the valve operation running (B).

It should be noted that in a conventional device in which the negative pressure from the vacuum pump 35 is not applied to the intake passage, when the running state returns back to the valve operation running (B) from the valve stop inertial running (A), the in-cylinder air quantity, as illustrated in a broken line c, the fuel injection quantity, as illustrated in a broken line d, and the engine output torque, as illustrated in a broken line e, rapidly increase immediately after being returned back to the valve operation running.

As in detail described above, in the present embodiment, at the same time with the start of the valve stop inertial running (A), the VSV 37 is controlled to be in the open state by the control of the ECU 50 (iv, S50), and the negative pressure from the vacuum pump 35 is applied to the intake passage section between the throttle valve 24 and the intake valve. As a result, the pressure in the intake passage section is reduced to be maintained to the low pressure in accordance with the output of the vacuum pump 35 (solid line a). Accordingly, when the running state returns back to the valve operation running (B) from the valve stop inertial running (A), a relatively large deal of fuel in accordance with a high intake conduit pressure such as an atmospheric pressure is not supplied, and therefore, it is possible to suppress vibrations due to the excessive engine torque while suppressing the possibility of the misfiring.

In addition, in the present embodiment, the vacuum pump 35 is configured to supply a negative pressure to the brake booster 32 for assisting a brake force of the brake. Therefore, the common vacuum pump 35 can be used for both of a reduction in pressure in the intake passage and supply of the negative pressure to the brake booster 32, and can appropriately reduce the pressure in the intake passage without remarkable addition of hardware.

In addition, in the present embodiment, there is further provided the VSV 37 that opens/closes a connecting conduit 36 for connecting the vacuum pump 35 and the intake passage, wherein the ECU 50 (intake pressure control unit 55) further controls the VSV 37. Accordingly, since the intake conduit pressure can be reduced by controlling the VSV 37, the present invention can obtain the desired effect with a simple configuration.

The order of the control by the valve stop mode control unit 53 is not limited to the order described in claim 1. That is, "the intake valve and the exhaust valve are stopped in the closed state during the rotation of the crank shaft", "supply of fuel to the engine 14 is stopped", "the throttle valve 24 of the engine 14 is controlled to be to an idling opening or less", and the "clutch C1 is controlled to be in the engaged state" may be executed at the same time, or may be executed in any order.

Next, an explanation will be made of a second embodiment of the present invention. In the aforementioned first embodiment, the VSV 37 is maintained to be in the open state over a period in which the valve stop inertial running is executed. However, since the common vacuum pump 35 is used in both of the brake booster 32 and the intake passage in the first embodiment, when the open state of the VSV 37 lasts long, a negative pressure for an operation of the brake booster 32 possibly becomes in short supply. Therefore, in the second embodiment, the VSV 37 is controlled to be intermittently operated in a period in which the valve stop inertial running is executed. Since the mechanical configuration of the second embodiment is the same as in the first embodiment, identical reference numbers are applied to identical components in the second embodiment, and the detailed explanation therefor is omitted.

Figure 5:
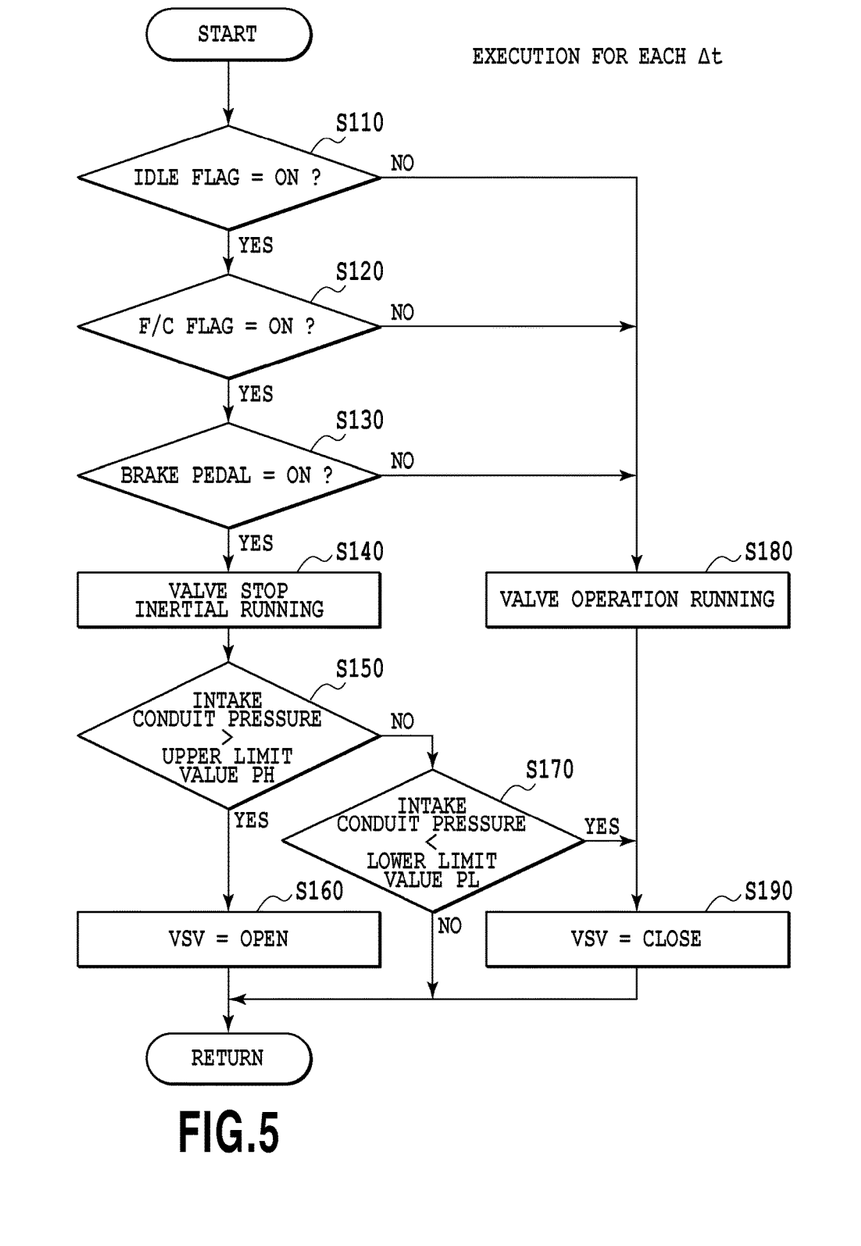
FIG. 5 is a flow chart explaining running mode selection control to be executed in a second embodiment.

FIG. 5 is a flow chart explaining the running mode selection control to be executed in the ECU 50 according to the second embodiment. The running mode selection control is repeatedly executed in a predetermined cycle time At on a condition that a not shown power switch is on.

In FIG. 5, first, the ECU 50 determines whether a predetermined idle flag is on (step S110), determines whether a predetermined fuel cut flag is on (step S120), and next, determines whether the brake pedal 31 is released (step S130). The processes in step S110 to step S130 are the same as those in step S10 to step S30 in the first embodiment as described above. If yes in all of step S110 to step S130 (that is, in a case where the idle flag and the fuel cut flag are on, and the brake pedal 31 is released), the process goes to step S140.

If yes in all of step S110 to step S130, that is, if the idle condition and the fuel cut condition are satisfied and the depressing pressure of the brake pedal 31 is at the threshold value or less (including zero), the ECU 50 determines that there is the request for valve stop inertial running, and in step S140, executes the valve stop inertial running. The process in step S140 is the same as that in step S40 in the first embodiment as described above.

Next, in step S150, the ECU 50 determines whether a pressure (intake conduit pressure) in the intake passage section between the throttle valve 24 and the intake valve is larger than a predetermined upper limit value PH. The upper limit value PH is lower than an atmospheric pressure (approximately 100 kPa), is higher than a pressure in the intake passage section at idling of the engine 14, and further, is set to a value (for example, 40 kPa) in which, in a case where the running state returns back to the valve operation running from the vale stop inertial running, even if the fuel injection starts with the fuel injection quantity in accordance with the upper limit value PH, a remarkable acceleration vibration does not occur.

If yes in step S150, that is, the intake conduit pressure is larger than the reference value PH, the process goes to step S160. In step S160, the ECU 50 controls the VSV 37 to be in an open state. When the VSV 37 is opened, a negative pressure from the vacuum pump 35 is applied to the intake passage section between the throttle valve 24 and the intake valve. When the above process is finished, the process is once returned.

The processes from step S120 to step S160 are repeatedly executed until the intake conduit pressure is equal to the reference value PH or smaller than that (S150) or until the condition of the valve stop inertial running becomes unsatisfied (S110 to S130). When the condition of the valve stop inertial running (S110 to S130) becomes unsatisfied at any point in time, the ECU 50 determines that there is no request for valve stop inertial running, and the process goes to step S180 and step S190, wherein the valve operation running is executed (S180) and the VSV 37 is controlled to be in a closed state (S190). The processes in step S180 and step S190 are the same as in step S60 and step S70 in the aforementioned first embodiment.

When the processes from step S120 to step S160 are repeatedly executed, as the intake conduit pressure is reduced by control of the open state of the VSV 37 (accordingly, suction of the intake passage by the vacuum pump 35) to become the upper limit value PH or less, the process goes to step S170. In step S170, the ECU 50 determines whether the intake conduit pressure is smaller than a predetermined lower limit value PL. The lower limit value PL is a value smaller than an atmospheric pressure (approximately 100 kPa) and the upper limit value PH, and is a value in the vicinity of an intake conduit pressure at idling of the engine 14, and further, is preferably a value (for example, 30 kPa) slightly smaller than the intake conduit pressure at idling of the engine 14 at a regular acceleration running.

Regularly, when the process comes to step S170, since the intake conduit pressure just became the upper limit value PH or less, a negative determination is made in step S170, and the process returns. Therefore, in a state where the VSV 37 is maintained to be in the open state, step S110 to step S150, and step S170 are repeatedly executed. As a result, the intake conduit pressure is gradually lowered from the upper limit value PH to the lower limit value PL.

In addition, when the intake conduit pressure becomes at the lower limit value PL or less, a negative determination is made in step S170, and the process goes to step S190, wherein the VSV 37 is made to be in the closed state, and the process returns. In the following cycle, in step S150 a negative determination is made, and in step S170 a positive determination is made, maintaining the VSV 37 to be in the closed state. When in step S190 the VSV 37 is once closed, air enters from a clearance in the periphery of the throttle valve 24, and the intake conduit pressure gradually increases. When the intake conduit pressure exceeds the lower limit value PL, in step S170 a negative determination is made, maintaining the closed state of the VSV 37. Therefore, the intake conduit pressure gradually increases from the lower limit value PL to the upper limit value PH.

When the above process is repeated, the VSV 37 is controlled to be intermittently in the open state such that the intake conduit pressure vibrates between the upper limit value PH and the lower limit value PL.

Figure 6:
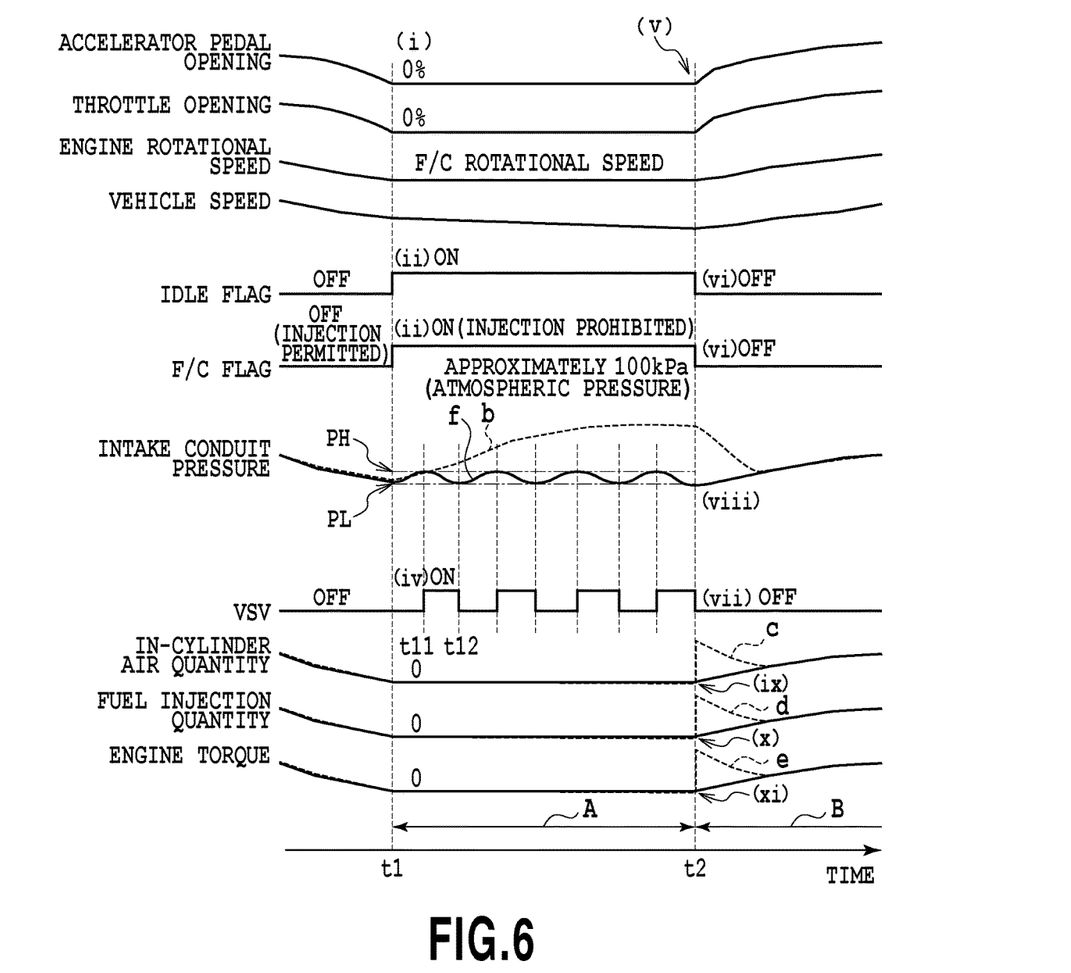
FIG. 6 is a time chart illustrating transition of various parameters in a case of executing the flow chart in FIG. 5.

FIG. 6 is a timing chart illustrating an example of an operation according to the second embodiment. A difference from the operation of the first embodiment lies in a point that the open state of the VSV 37 intermittently occurs during execution of the valve stop inertial running (A), and as a result, an intake conduit pressure (solid line f) repeatedly increases/decreases. The intake conduit pressure exceeds the upper limit value PH (t11, S150), and when the suction once starts (S160), the suction continues across until the intake conduit pressure becomes the lower limit value PL or less (S170). When the intake conduit pressure becomes at the lower limit value PL or less (t12, S170), the VSV 37 is closed (S190), and the closed state is maintained until the intake conduit pressure exceeds the upper limit value PH next.

As described above, in the second embodiment, in a case where the request for valve stop inertial running is made, the ECU 50 (intake conduit pressure control unit 55) is further configured to control the intake conduit pressure to be below the predetermined upper limit value PH lower than the atmospheric pressure. As a result, by setting the upper limit value PH to an appropriate value (particularly, a value higher than the intake conduit pressure at idling of the engine 14), the open state of the VSV 37 is made to intermittently occur, thus making it possible to suppress the degree of use of the negative pressure of the vacuum pump 35 by the intake passage.

According to the second embodiment, for realizing the intake conduit pressure smaller than the upper limit value PH during execution of the valve stop inertial running, the VSV 37 is controlled to be intermittently in the open state. However, in a case where the VSV 37 and the control circuit thereof are configured such that an opening of the VSV 37 can proportionally be controlled between full opening and full closing, the intake conduit pressure smaller than the upper limit value PH can be realized by such proportional control as well.

In each of the aforementioned embodiments, the vacuum pump 35 directly connected to the cam shaft 27 is used, but there may be used a vacuum pump driven by a rotary element other than the cam shaft in the engine 14, for example, the crank shaft. In this case, an example of the variable valve mechanism may include a mechanism in which the cam shaft is stopped during execution of the valve stop inertial running (for example, a mechanism that can connect or disconnect power transmission between the crank shaft and the cam shaft) or a mechanism having no cam shaft (for example, electromagnetic intake and exhaust valves).

A clutch may be provided between the vacuum pump 35 and the cam shaft 27 to stop the vacuum pump 35 during the operation of the cam shaft 27. In this case, the VSV 37 may be opened to supply a negative pressure to the brake booster 32 by the intake conduit negative pressure.

In each of the aforementioned embodiments, the common vacuum pump 35 is used for both of the reduction in pressure in the intake passage and the supply of the negative pressure to the brake booster 32, but a vacuum pump exclusive for the reduction in pressure in the intake passage maybe used aside from the vacuum pump for the brake booster. This exclusive vacuum pump can be controlled to operate only in a case where a reduction of the intake conduit pressure is requested.

In the present invention, an electronically-operated vacuum pump may be used.

In each of the aforementioned embodiments, the clutch C1 configuring a part of the automatic transmission 16 is exemplified as a clutch, but the clutch C1 may be provided independently from the automatic transmission 16. For example, in a case where the automatic transmission 16 is a belt type continuously variable transmission, an example of the clutch in the present invention may include a well-known forward/backward switching device provided in a vehicle together with a continuously variable transmission independently from the continuously variable transmission or an engaging device included in the forward/backward switching device.

The clutch C1, by controlling the engaging force in a non-stepwise manner (torque capacity control), may realize a fully engaged state of transmitting the entire power from the engine 14 to the driving wheels 20, a released state of not transmitting the power from the engine 14 to the driving wheels 20 at all, and besides, a partially engaged state, that is, an engaged state of transmitting only a part of the power from the engine 14 to the driving wheels 20 by the sliding of the driving member and the driven member in the clutch C1 each other. By this partially engaged state also, it is possible to execute the valve stop inertial running and the valve operation running in the present invention.

The embodiment of the present invention is not limited to each of the aforementioned embodiments and modifications, and the present invention can include all modifications and applications contained in the subject of the present invention defined by the clams and its equivalents. Therefore, the present invention should be not interpreted in a limiting manner, and can be applied also to any other technologies within the scope in the subject of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for a vehicle and configured to control the vehicle, the control apparatus comprising:
   a valve operation mechanism that can stop intake valves and exhaust valves in an engine in a closed state during rotation of an output shaft of the engine;
   a vacuum pump connected to an intake passage section through a branch passage, the branch passage having a vacuum switching valve to selectively realize open and closed states of the branch passage;
   a clutch that can switch a power transmission route between the engine and a driving wheel between an engaged state and a disengaged state; and
   an electronic control unit (ECU) including a computer, memory, an input interface, and an output interface, the computer including a processor for executing programs stored in the memory for controlling various controls of the vehicle, wherein
   the ECU is configured to stop the intake valves and the exhaust valves in all cylinders of the engine in the closed state during the rotation of the output shaft, stop supply of fuel to the engine, control a throttle valve of the engine to an idling opening or less, and set the clutch in the engaged state to drive pistons of the engine by a rotational force of the driving wheel through the output shaft, in a case where a request for valve stop inertial running is made; and
   the ECU is configured to control a valve actuator to control the valve switching valve to realize the open state of the branch passage and thus the vacuum pump supplies a negative pressure to the intake passage section so that an intake conduit pressure is below a predetermined upper limit value lower than an atmospheric pressure all the time until fuel injection restarts, in the case where the request for valve stop inertial running is made.

2. The control apparatus for the vehicle according to claim 1, wherein the vacuum pump is configured to supply a negative pressure to a brake booster for assisting a brake force of a brake.

* * * * *